United States Patent [19]

Aubert

[11] Patent Number: 5,120,266
[45] Date of Patent: Jun. 9, 1992

[54] DEVICE FOR THE AUTOMATIC EVISCERATION OF SLAUGHTERED ANIMAL CARCASSES

[76] Inventor: Georges Aubert, La Roumiguiere-Mas d'Armor, Roquevaire, France

[21] Appl. No.: 555,513

[22] PCT Filed: Dec. 15, 1989

[86] PCT No.: PCT/FR89/00655

§ 371 Date: Aug. 9, 1990

§ 102(e) Date: Aug. 9, 1990

[87] PCT Pub. No.: WO90/06685

PCT Pub. Date: Jun. 28, 1990

[30] Foreign Application Priority Data

Dec. 19, 1988 [FR] France .................. 88 17198
Jan. 9, 1989 [FR] France .................. 89 00343

[51] Int. Cl.⁵ ............................................. A22B 5/20
[52] U.S. Cl. ................................ 452/120; 452/106; 452/123; 452/160; 452/176
[58] Field of Search ............. 452/120, 106, 119, 123, 452/176, 160

[56] References Cited

U.S. PATENT DOCUMENTS

| | | | |
|---|---|---|---|
| 3,829,932 | 8/1974 | Griss | 452/160 |
| 3,995,350 | 12/1976 | Ekstam | 452/160 |
| 4,087,886 | 5/1978 | Aubert | 452/160 |
| 4,667,371 | 5/1987 | Vogt | 452/160 |
| 4,924,551 | 5/1990 | Greenbank et al. | 452/106 |
| 4,970,756 | 11/1990 | Durand | 452/160 |

FOREIGN PATENT DOCUMENTS

| | | |
|---|---|---|
| 3123994 | 5/1982 | Fed. Rep. of Germany . |
| 3714677 | 11/1988 | Fed. Rep. of Germany . |
| 2324238 | 4/1977 | France . |
| 644440 | 1/1979 | U.S.S.R. .................. 452/106 |

*Primary Examiner*—Willis Little
*Attorney, Agent, or Firm*—Sandler, Greenblum & Bernstein

[57] ABSTRACT

Apparatus intended for implementation in a high speed industrial slaughter house for the automatic evisceration of slaughtered animal carcasses including an automatic mechanical distribution and anal obstructor system, and a mobile structure supporting a circular blade for ventral incision, a circular saw for progressive penetration into the sternum, and nozzles projecting water at an adjustable pressure for disengaging the entrails from the path of the cutting tools.

20 Claims, 2 Drawing Sheets

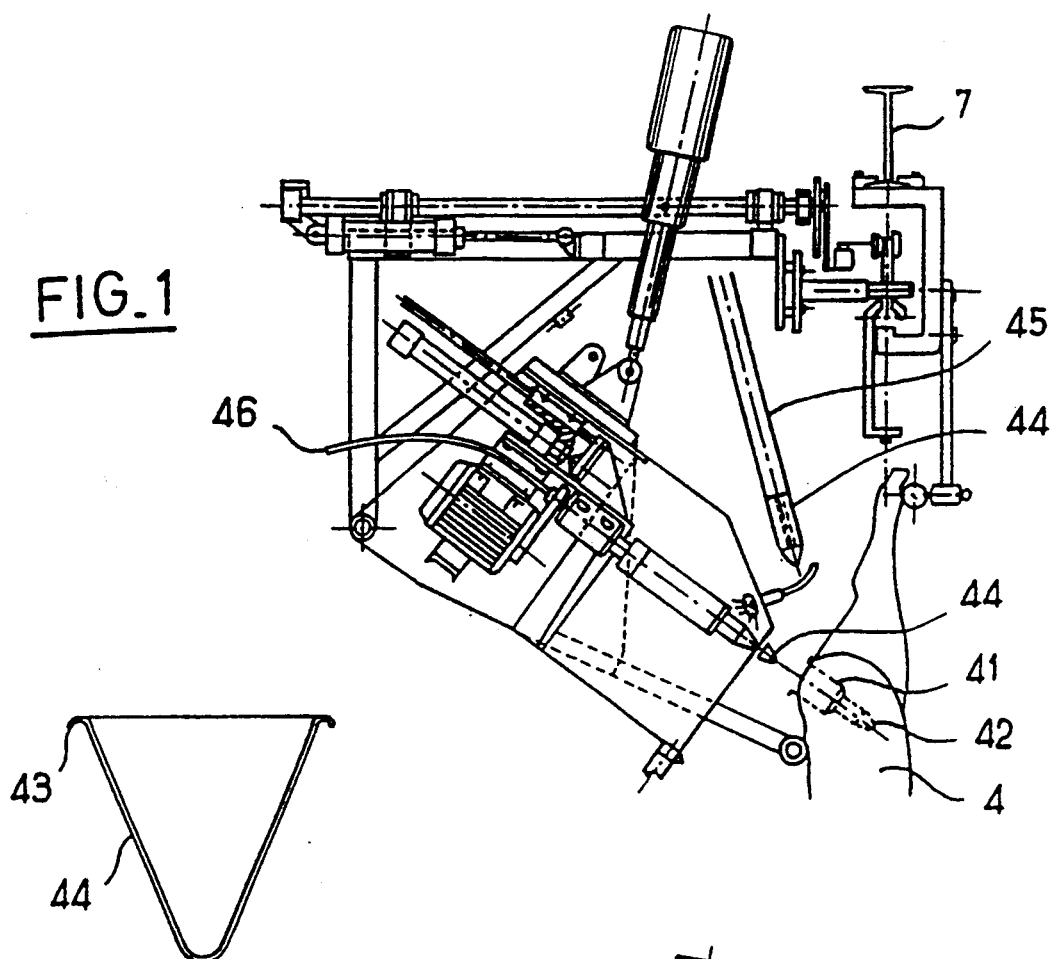
FIG.1
FIG.3
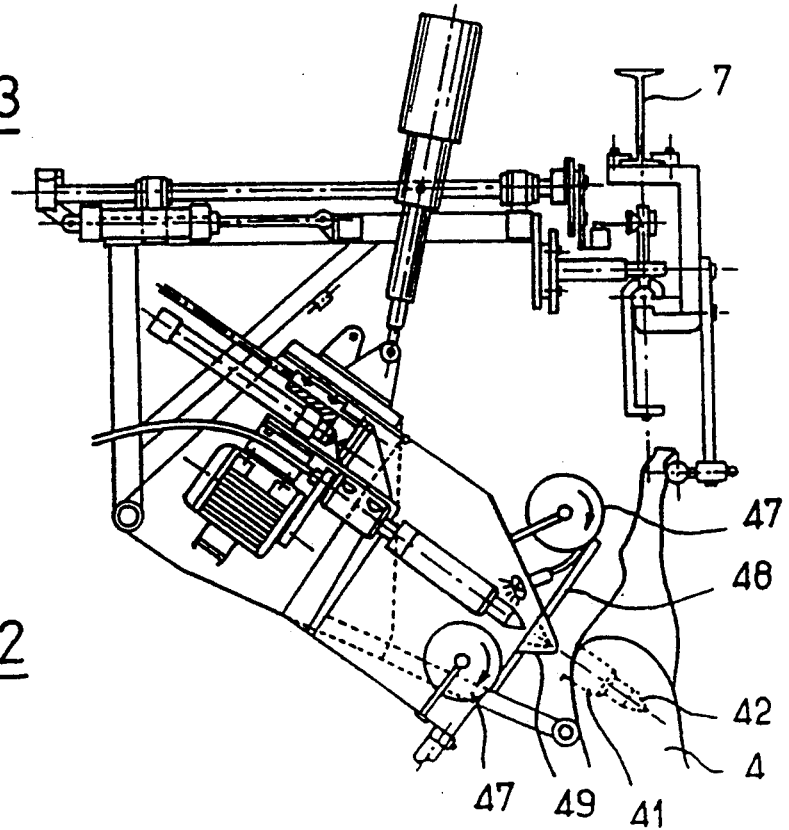
FIG.2

DEVICE FOR THE AUTOMATIC EVISCERATION OF SLAUGHTERED ANIMAL CARCASSES

BACKGROUND OF THE INVENTION

1. Field of the Invention

The object of the present invention is a device for the automatic evisceration of slaughtered animal carcasses. It is intended for implementation in a high-speed industrial slaughter house.

2. Discussion of Background and Material Information

In the devices constructed up until the present invention, the sectioning elements often perforated the intestines as a result of penetrating too deeply during the incision which permits the extraction of the entrails, especially due to imprecision of mechanical positioning methods. As a result, up until now most of the equipment was unusable to permit high speed treatment in industrial slaughter houses, just as they could not detach the lard from the pig carcasses.

Also, the Veterinary Hygiene Services of the European Community require a procedure to obstruct the anal orifice of slaughtered animals.

SUMMARY OF THE INVENTION

The device according to the present invention eliminates these drawbacks and allows, even when performing high speed work, to proceed automatically to seal the anal orifice and assure the longitudinal cut in the ventral surface of the carcasses at the same time as that of the bony part of the sternum, without it being possible to reach the entrails.

The device according to the present invention is composed of of an automatic mechanical distribution and anal obstructor installation system, a moveable frame supporting a circular blade for the incision of the ventral part, a circular saw for progressive penetration in the sternum and an ensemble for disengaging the entrails from the path of the cutting tools, including nozzles projecting water at an adjustable pressure.

BRIEF DESCRIPTION OF THE DRAWINGS

In the attached drawings, given as a non-limiting example, of one of the forms of construction of the object of the invention:

FIGS. 1 and 2 illustrate two variations of the distribution and anal obstructor installation system.

FIG. 3 illustrates an anal obstructor on another scale.

The device, FIGS. 1-5, is implanted near a rail 7 on which the carcasses 4 are hung on hooks 19 pulled by a chain 6, and is constituted of an anal obstructor distribution system, of a moveable frame 22 vertically carrying a tilting table 8 and the means to incise the ventral part of the carcasses, of a cutting tool 2 to section the entrails, of nozzles 17, 18, 28, to project water.

Figure 4:
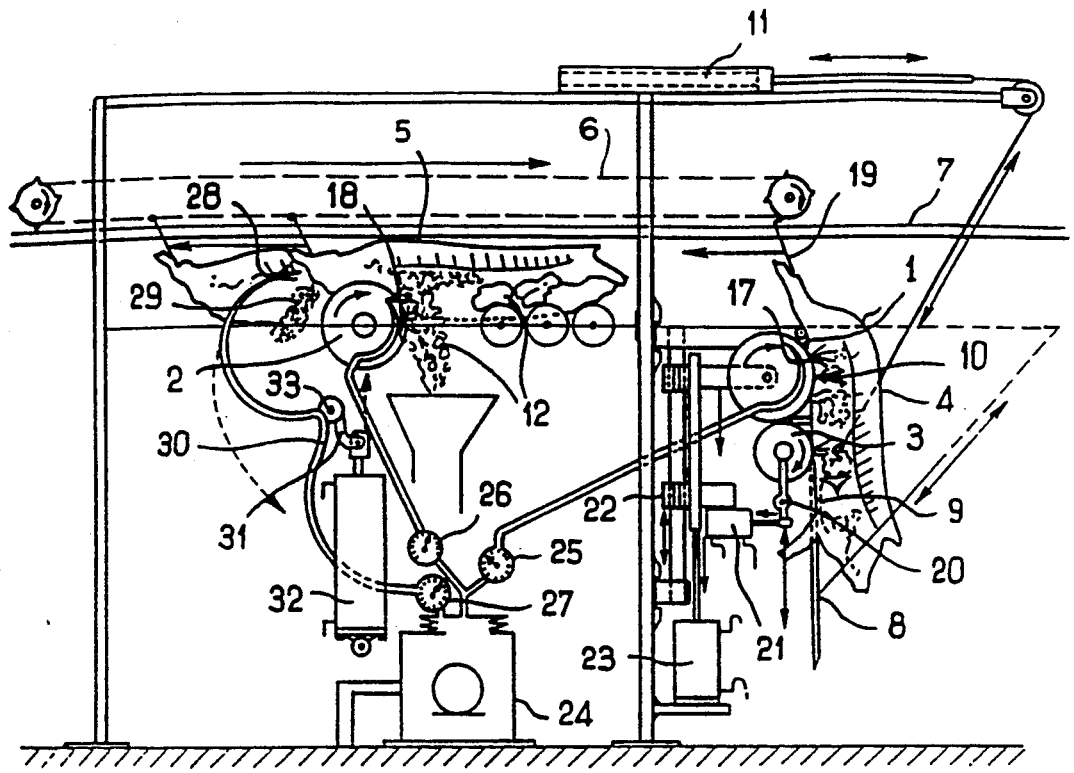
FIG. 4 is a view of the ensemble of the evisceration device, from an elevated view and in a lengthwise section.
Figure 5:
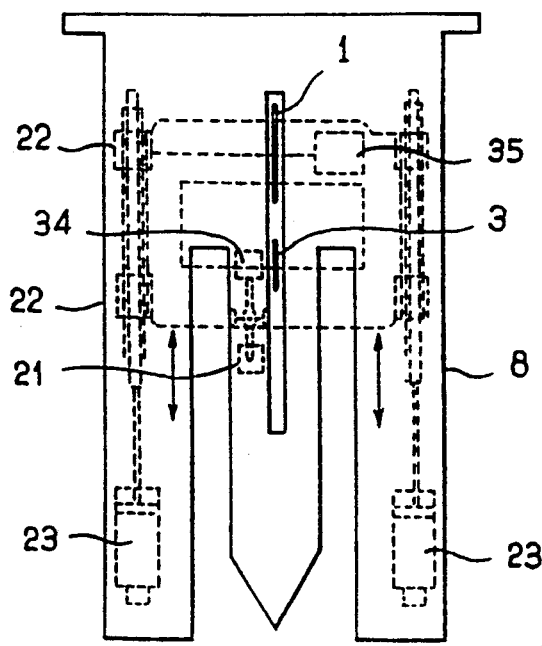
FIG. 5 illustrates the tilting table seen from the front.

The goal of the distribution and anal obstructor installation system is to complete the clipping ensemble of the anus in order to resolve the problem of the materials contained in the intestine which can spill on or in the carcass 4. This obstructor 44 is preferably hollow and conically-shaped, molding the end of the centering mandrel 42 of the rectum clipping tool, and is made in a similar plastic material. It permits an easy introduction into the inside of the anus, while scraping whatever adheres to the internal walls, thus assuring the cleanliness of the centering mandrel 42, thanks to a peripheral collar 43 which also permits the obstructor to be held in place.

An automatic stacking distributor 45 (FIG. 1) takes the obstructors 44 one by one on the trajectory of the mandrel 42. When the mandrel meets the obstructor, it is held on the end of it by a vacuum created by a tube 46. Once penetration into the anus 41 is finished, the vacuum is broken and a blowing detaches the obstructor 44.

In a variation on the construction, the automatic distributor consists of two bobbins 47, (FIG. 2) which unwind constructed of front of the mandrel 42 a precut band 48 in plastic or the equivalent. The precut part 49 is freed and moved by the push of the mandrel 42 at the moment of its penetration into the anus.

The carcass 4 then presents the ventral part 10 on the table 8 in a vertical position. By a central opening in the table, the circular blade 1, driven by the motor 35 and the circular saw 3 open at the same time, respectively, the stomach 10 and the sternum 9 by movement towards the base of the frame 22 by the effect of screw jack 23, while the pressurized water projected by the nozzle 17 holds the entrails 12 away from the cutting elements. At the end of the operation, information is transmitted to the screw jack 11 which brings the table 8 back into a horizontal position. The carcass is then pulled by the chain 6, the ventral part 10 towards the bottom, and first encounters the sectioning tool 2 which will detach the entrails 12 separated by the pressurized water projected by the nozzles 18, and an arm 31 attached to an axis 33 activated by the jack screw 32 and carrying a nozzle 28 supplied by a supple conduit 30, whose function, in the case of pig carcasses, is to detach the lard 29 by a very strong pressure regulated by the pressure gauge 27.

The circular saw 3 driven by the motor 34 is mounted on an arm attached to an axis 20 activated by a screw jack 21 to progressively penetrate into the carcass 4, the sternum being thinner on the ventral side than between the shoulders.

The pressurized water is furnished by a pump 24. Adjusting the different pressures according to the parts to be treated requires several pressure gauges 25, 26, 27.

The position of the different constitutive elements gives the device maximum useful effects which had not been obtained up until now by similar devices.

I claim:

1. Apparatus for automatic evisceration of slaughtered animal carcasses for implementation in a high-speed industrial slaughter house which automatically obstructs the anal orifice of a carcass and ensures a longitudinal cut of the ventral surface of the carcass at the same time as the bony portion of the sternum without reaching the entrails, comprising:

an automatic mechanical distribution and anal obstructor system;

a vertically movable frame;

a tilting table supported on said vertically movable frame, said tilting table including means defining a slot through which a circular incision blade passes for cutting the ventral surface of the carcass, and through which a circular saw passes for progressive penetration of the sternum;

a sectioning tool for detaching the entrails of the carcass; and means for clearing the entrails of the carcass from a cutting path of said circular incision blade and said circular saw, said means for clearing comprising nozzles for projecting water under an adjustable pressure.

2. The apparatus according to claim 1, further including a pump for supplying water to said nozzles.

3. The apparatus according to claim 1, wherein said automatic mechanical distribution and anal obstructor system includes an anal obstructor, and said anal obstructor comprises a conical cup.

4. The apparatus according to claim 3, wherein said conical cup includes a peripheral collar at its base portion.

5. The apparatus according to claim 3, wherein said conical cup is hollow.

6. The apparatus according to claim 5, wherein said conical cup is constructed of a plastic material.

7. The apparatus according to claim 3, wherein said automatic mechanical distribution and anal obstructor system includes a group of conical cups which are stacked within means for storing the group of conical cups.

8. The apparatus according to claim 7, wherein said automatic mechanical distribution and anal obstructor system further includes a centering mandrel associated with a rectum clipping tool, with a distribution system for distributing said conical cups, one after the other, as said centering mandrel is positioned between an anus of a carcass and its return location waiting for passage of the next carcass.

9. The apparatus according to claim 8, wherein said each conical cup is shaped to fit on said centering mandrel.

10. The apparatus according to claim 7, wherein said distribution system permits automatic distribution by pressure of the anal obstructors on a trajectory of said centering mandrel as it moves to penetrate into the anus.

11. The apparatus according to claim 10, wherein, during penetration of said centering mandrel into the anus, said automatic mechanical distribution and anal obstructor system permits an anal obstructor to be held on an end of said centering mandrel by vacuum, and permits the anal obstructor to be detached by blowing.

12. The apparatus according to claim 11, wherein said automatic mechanical distribution and anal obstructor system including tube means for creating a vacuum.

13. The apparatus according to claim 10, wherein said distribution system includes two bobbins permitting a precut strip to unwind in front of the centering mandrel, with the precut plastic strip being capable of being freed and drawn by said centering mandrel upon its penetration into the anus.

14. The apparatus according to claim 13, wherein said precut strip is composed of a plastic material.

15. The apparatus according to claim 1, further including motors for activating said vertically movable frame which supports said tilting table permitting said vertically movable frame to descend the length of a stomach of a carcass to enable simultaneous opening of the ventral and sternum portions of the carcass, and to raise to a waiting position for a next carcass.

16. The apparatus according to claim 15, wherein said circular saw is mounted onto an arm attached to an axis, a screw jack being mounted to the axis to provide progressive movement to the circular saw to cut the sternum.

17. The apparatus according to claim 16, further including nozzles supplied by a water supply conduit, said nozzles being mounted on a jointed arm which enable the nozzles to reach the lard of the carcass as the carcass passes, and to detach the lard by water pressure.

18. The apparatus according to claim 17, further including a pump for supplying said nozzle mounted on the jointed arm with water.

19. The apparatus according to claim 17, further including pressure gauges for regulating water pressure.

20. The apparatus according to claim 18, further including a screw jack for activating the joined arm.

* * * * *